(No Model.)  3 Sheets—Sheet 2.

J. FORMAN.
COAL CHUTE.

No. 492,281. Patented Feb. 21, 1893.

Witnesses:
Murray C. Boyer
A. V. Groupe

Inventor:
John Forman
by his Attorneys
Howson & Howson

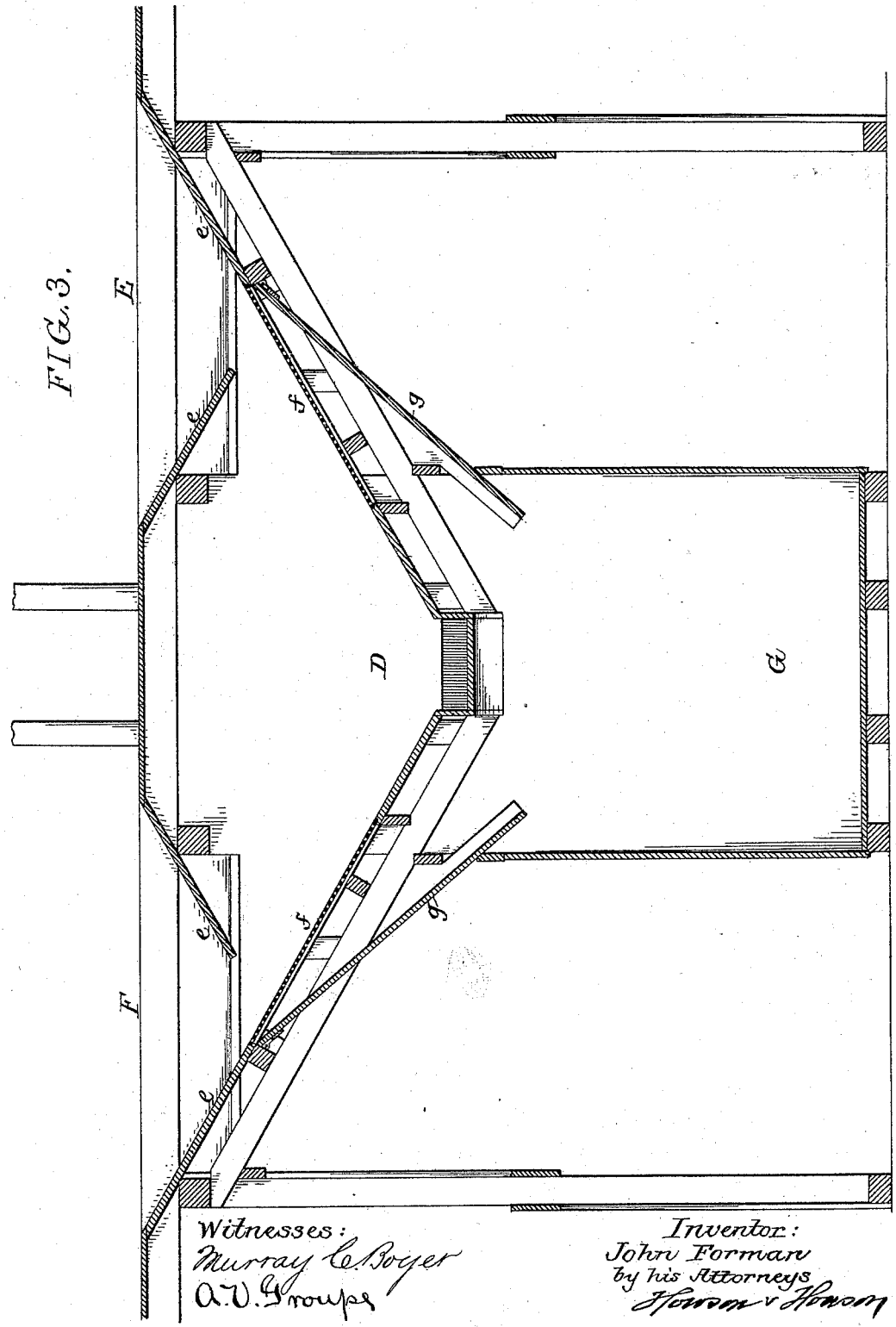

United States Patent Office.

JOHN FORMAN, OF POTTSTOWN, PENNSYLVANIA.

COAL-CHUTE.

SPECIFICATION forming part of Letters Patent No. 492,281, dated February 21, 1893.

Application filed September 17, 1891. Serial No. 405,948. (No model.)

*To all whom it may concern:*

Be it known that I, JOHN FORMAN, a citizen of the United States, and a resident of Pottstown, Montgomery county, Pennsylvania, have invented certain Improvements in Coal-Chutes, of which the following is a specification.

The object of my invention is to so construct a chute for use in handling coal, and analogous material, that the contents of a number of cars can be discharged into the chute at the same time. This object I attain in the following manner, reference being had to the accompanying drawings, in which:—

Figure 1:
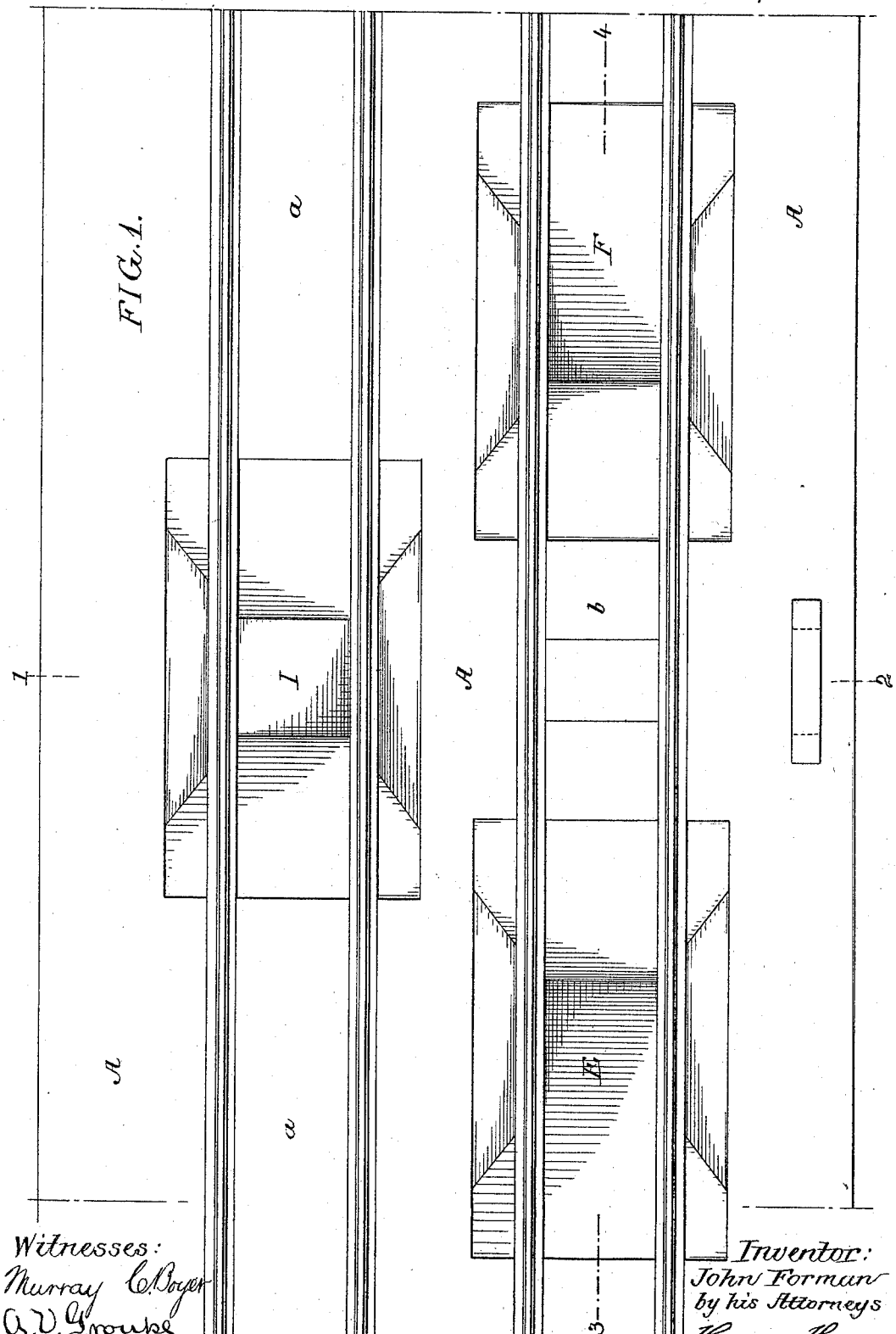
Figure 2:
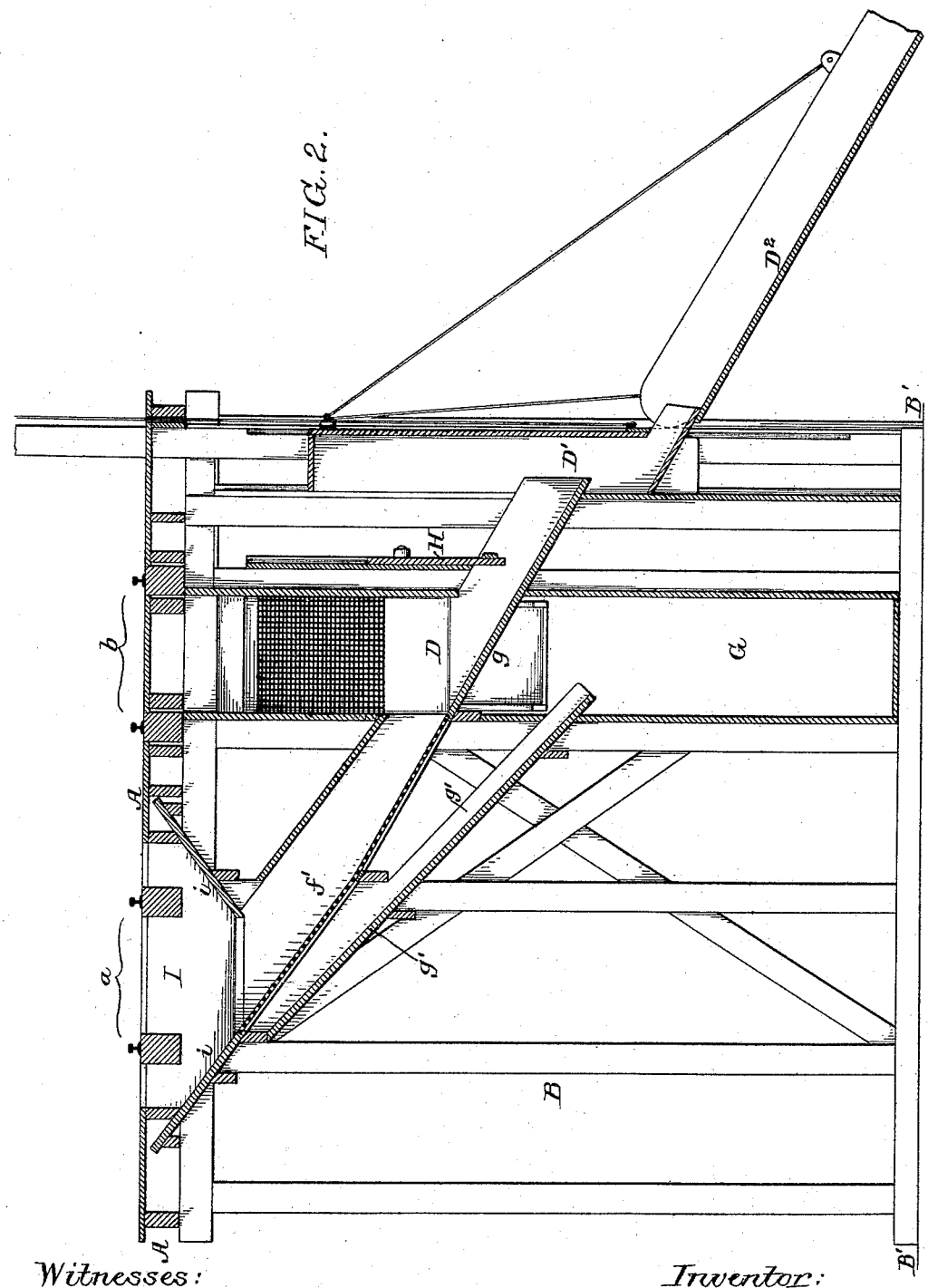

Figure 1, is a plan view showing a platform and tracks, and three openings through which the material is carried to the chute; Fig. 2, is a transverse section on the line 1—2, Fig. 1; Fig. 3, is a longitudinal sectional view on the line 3—4, Fig. 1.

Referring to the drawings, $a$ and $b$ are the two tracks parallel with each other, mounted on the platform A, which is supported by the usual frame work B. In the present instance, the structure is mounted on a wharf B′, and is adapted to transfer coal or like material from cars to boats.

D is the main chute connecting with a sliding chute D′ to which is pivoted an adjustable chute $D^2$ for carrying the coal from the main chute D to the vessel. The portions D′, $D^2$ can be raised to accommodate the chute to different heights of vessels; this portion of the device, however, forms no part of my present invention.

Between the rails of the track $b$ are two openings E and F, formed of inclined guide plates $e$ for directing the coal into the chute D. The coal as it passes down the inclined plates, travels over screens $f$, and the dust and dirt in the coal are screened therefrom. The dust and dirt fall onto inclined boards forming dust chutes $g$, $g$, and are directed into the dust bin G.

Between the rails of the track $a$, is an opening I, formed by the inclined plates $i$, which direct the coal as it falls from the car onto the screen $f'$, separating the dirt from the coal, and directing the coal to the main chute D, the dirt falling on the inclined boards, forming a dust chute $g'$, and is directed into the bin G.

A valve H is interposed between the main chute D and the portion D′, so that the flow from the chute can be regulated by the attendant.

It will thus be seen by the above description, that I am enabled to discharge from three cars simultaneously, and separately screen the coal from the said cars, and carry the screened coal into a single delivery chute to be transferred to the vessel or other carrier; thus considerable time is saved in unloading the cars, and the device also saves considerable time in the loading of boats or other carriers. The movement of the trains can be so arranged, that while the cars on one track are unloading, the cars on the other track are shifting so as to present a loaded car or cars to the opening.

In some instances, I might provide two openings I, I, between the tracks $a$ in order to discharge the contents of two cars at the same time on the track $a$.

I claim as my invention—

An apparatus comprising the tracks $a$, $b$, a main chute having an opening beneath the tracks $a$, a supplemental chute on each side of such main chute and communicating at one end with said main chute, and at the opposite end with openings beneath the tracks $b$, screens in each of said chutes, a guide board under each of said screens, and a bin, as G, to which each of said guide boards extends and into which the screenings are discharged, substantially as specified.

In testimony whereof I have signed my name to this specification in the presence of two subscribing witnesses.

JOHN FORMAN.

Witnesses:
HENRY HOWSON,
EUGENE ELTERICH.